United States Patent
Chamberlain et al.

(10) Patent No.: US 9,650,303 B2
(45) Date of Patent: May 16, 2017

(54) SILICON CARBIDE CERAMIC MATRIX COMPOSITES

(71) Applicant: Rolls-Royce Corporation, Indianapolis, IN (US)

(72) Inventors: Adam L. Chamberlain, Mooresville, IN (US); Andrew J. Lazur, Huntington Beach, CA (US); Kang N. Lee, Zionsville, IN (US)

(73) Assignee: Rolls-Royce Corporation, Indianapolis, IN (US)

( * ) Notice: Subject to any disclaimer, the term of this patent is extended or adjusted under 35 U.S.C. 154(b) by 728 days.

(21) Appl. No.: 14/143,724

(22) Filed: Dec. 30, 2013

(65) Prior Publication Data

US 2016/0102022 A1 Apr. 14, 2016

Related U.S. Application Data

(60) Provisional application No. 61/794,581, filed on Mar. 15, 2013.

(51) Int. Cl.
| | |
|---|---|
| *C04B 35/80* | (2006.01) |
| *C04B 35/78* | (2006.01) |
| *C04B 35/565* | (2006.01) |
| *C04B 35/628* | (2006.01) |

(52) U.S. Cl.
CPC ............ *C04B 35/78* (2013.01); *C04B 35/565* (2013.01); *C04B 35/62868* (2013.01); *C04B 35/62873* (2013.01); *C04B 35/62897* (2013.01); *C04B 35/806* (2013.01); *C04B 2235/3217* (2013.01); *C04B 2235/3224* (2013.01); *C04B 2235/3225* (2013.01); *C04B 2235/3427* (2013.01); *C04B 2235/3891* (2013.01); *C04B 2235/40* (2013.01); *C04B 2235/402* (2013.01); *C04B 2235/428* (2013.01); *C04B 2235/5244* (2013.01); *C04B 2235/614* (2013.01); *C04B 2235/616* (2013.01); *C04B 2235/80* (2013.01)

(58) Field of Classification Search
CPC ... C04B 35/806; C04B 35/565; C04B 35/573; C04B 41/4584; C04B 41/4596; C04B 41/455; C04B 41/5096; C04B 41/52
See application file for complete search history.

(56) References Cited

U.S. PATENT DOCUMENTS

| | | | |
|---|---|---|---|
| 5,340,655 | A | 8/1994 | Creber et al. |
| 5,468,358 | A | 11/1995 | Ohkawa |
| 5,876,659 | A | 3/1999 | Yasutomi et al. |
| 5,952,100 | A | 9/1999 | Corman et al. |

(Continued)

FOREIGN PATENT DOCUMENTS

| | | | |
|---|---|---|---|
| CN | 102557641 | * | 7/2012 |
| WO | 2012063923 A1 | | 5/2012 |

OTHER PUBLICATIONS

Lee, J.K. et al, "Characterization of SiC based composite materials by the infiltration of ultra-fine SiC particles", Fusion Engineering and Design, Elsevier Science Publishers, Amsterdam, NL, vol. 85, No. 7-9, Dec. 1, 2010, pp. 1376-1380.

(Continued)

*Primary Examiner* — Karl Group
(74) *Attorney, Agent, or Firm* — Brinks Gilson & Lione

(57) ABSTRACT

Ceramic matrix composite materials and processes for making said composite materials are disclosed.

13 Claims, 4 Drawing Sheets

(56) References Cited

U.S. PATENT DOCUMENTS

| | | | |
|---|---|---|---|
| 5,962,103 | A | 10/1999 | Luthra et al. |
| 6,322,889 | B1 | 11/2001 | Lara-Curzio et al. |
| 6,331,496 | B2 | 12/2001 | Nakayasu |
| 6,347,446 | B1 | 2/2002 | Luthra et al. |
| 6,365,233 | B1 | 4/2002 | Corman et al. |
| 6,899,777 | B2 | 5/2005 | Vaidyanathan et al. |
| 7,318,906 | B2 * | 1/2008 | Kohyama .............. B82Y 30/00 264/625 |
| 7,404,922 | B2 * | 7/2008 | Kohyama ............. C04B 35/571 264/641 |
| 8,137,826 | B2 | 3/2012 | Louchet-Pouillerie et al. |
| 8,309,197 | B2 | 11/2012 | Davis et al. |
| 8,343,589 | B2 | 1/2013 | Kirby et al. |
| 2004/0028941 | A1 | 2/2004 | Lane et al. |
| 2004/0113332 | A1 | 6/2004 | Kohyama et al. |
| 2005/0001361 | A1 | 1/2005 | Kohyama et al. |
| 2009/0169873 | A1 | 7/2009 | Louchet-Pouillerie et al. |
| 2010/0081350 | A1 | 4/2010 | McCabe et al. |
| 2011/0219775 | A1 | 9/2011 | Jarmon et al. |
| 2013/0288880 | A1 * | 10/2013 | Hinoki .................... B32B 18/00 501/88 |

OTHER PUBLICATIONS

Kim W-J et al, "Optimization of an Interphase Thickness in Hot-Pressed SiCf/SiC Composites", Ceramic Engineering and Science Proceedings; Ceramics in Nuclear Applications—33rd International Conference on Advanced Ceramics and Composites, American Ceramic Society Inc., US, Daytona Beach, FL, vol. 30, No. 10, Jan. 1, 2010, pp. 77-82.

Lee J-S et al, Fabrication of short-fiber reinforced SiC composites by polycarbosilane infiltration, Journal of the European Ceramic Society, Elsevier Science Publishers, Marking, Essex, GB, vol. 24, No. 1, Jan. 1, 2004, pp. 25-31.

Dong S et al. "Processing optimization and mechanical evaluation of hot pressed 2D Tyranno-SA SiC composites", Journal of the European Ceramic Society, Elsevier Science Publishers, Barking, Essex, GB, vol. 23, No. 8, Jul. 1, 2003, p. 1224.

International Search Report for PCT International Application Serial No. PCT/US2014/020722, completed Aug. 25, 2014, (19 pages).

* cited by examiner

SILICON CARBIDE CERAMIC MATRIX COMPOSITES

CROSS REFERENCE TO RELATED APPLICATIONS

This application claims priority to and the benefit of U.S. Provisional Patent Application No. 61/794,581, filed 15 Mar. 2013, the disclosure of which is now incorporated herein by reference.

FIELD OF THE DISCLOSURE

The present disclosure relates generally to composite materials, and more specifically to a process for making composite materials.

BACKGROUND

Gas turbine engines are used to power aircraft, watercraft, power generators, and the like. Gas turbine engines typically include a compressor, a combustor, and a turbine. The compressor compresses air drawn into the engine and delivers high pressure air to the combustor. In the combustor, fuel is mixed with the high pressure air and ignited. Products of the combustion reaction in the combustor are directed into the turbine where work is extracted to drive the compressor and, sometimes, an output shaft. Left-over products of the combustion are exhausted out of the turbine and may provide thrust in some applications.

Economical and environmental concerns, i.e. improving efficiency and reducing emissions, are the main driving force behind the ever increasing demand for higher gas turbine inlet temperatures. A limitation to the efficiency and emissions of many gas turbine engines is the temperature capability of hot section components (example, but not limited to blades, vanes, blade tracks, combustor liners). Technology improvements in cooling, materials, and coatings are required to achieve higher inlet temperatures. As the temperature capability of nickel (Ni)-based superalloys has approached their intrinsic limit, further improvements in their temperature capability have become increasingly difficult. Next generation high temperature materials, such as ceramic-based materials, may be excellent materials for use in gas turbines.

Ceramic based materials such as silicon carbide (SiC/SiC) may replace nickel based superalloys for hot section structural components for next generation gas turbine engines. A benefit of SiC/SiC CMC engine components is their excellent high temperature mechanical, physical and chemical properties which allow gas turbine engines to operate at much higher temperatures than the current engines having superalloy components. SiC/SiC CMCs also provide the additional benefit of damage tolerance, which monolithic ceramics do not possess.

SUMMARY

The present application discloses one or more of the features recited in the appended claims and/or the following features which, alone or in any combination, may comprise patentable subject matter.

According to one aspect, a method of producing a silicon carbide (SiC) ceramic matrix composite (CMC) is disclosed. The method includes incorporating yttrium or ytterbium into a CMC via slurry infiltration. In some embodiments, yttrium or ytterbium may be an oxide, silicate, silicide, or aluminum-silicon eutectic alloy. In some embodiments, the method may include aluminum oxide in a slurry during slurry infiltration. Additionally, in some embodiments, the method may include infiltrating the CMC with molten silicon.

According to another aspect, a ceramic matrix composite (CMC) includes a rare earth silicide. in some embodiments, the rare earth silicide may be YSi, Y5Si4, Y5Si3, Yb3Si5, or YbSi.

A method of producing a silicon carbide (SiC) ceramic matrix composite (CMC) may comprise incorporating yttrium or ytterbium into a CMC. The yttrium or ytterbium may be, incorporated into a slurry and delivered via slurry infiltration.

In some embodiments, the yttrium or ytterbium is an oxide, silicate, silicide, or aluminum-silicon eutectic alloy.

In some embodiments, the slurry further includes aluminum oxide.

In some embodiments, the method further includes incorporating molten silicon into the CMC. The molten silicon may be included in the slurry.

A ceramic matrix composite (CMC) may comprise a rare earth silicide.

In some embodiments, the rare earth silicide is YSi, $Y_5Si_4$, $Y_5Si_3$, $Yb_3Si_5$, or YbSi.

These and other features of the present disclosure will become more apparent from the following description of the illustrative embodiments.

DETAILED DESCRIPTION OF THE DRAWINGS

The present application discloses one or more of the features recited in the appended claims and/or the following features which, alone or in any combination, may comprise patentable subject matter.

Figure 1:
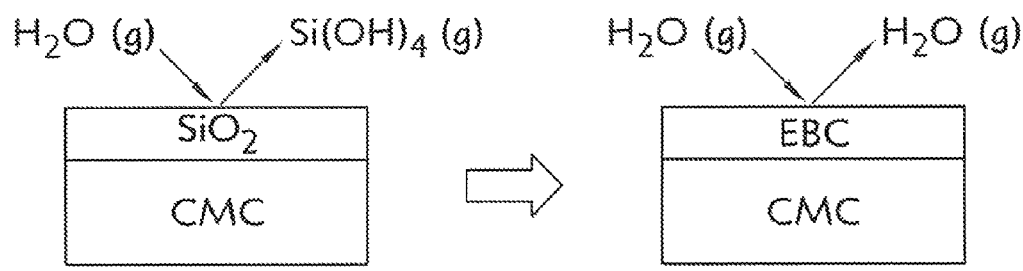
FIG. 1 is a diagram and formulae for the active oxidation of a SiC/SiC ceramic matrix composite.

Silicon carbide-silicon carbide (SiC/SiC) ceramic composites can suffer from active oxidation when exposed to the environment of a turbine engine. As shown in FIG. 1, active oxidation is a result of the instability of silicon dioxide ($SiO_2$) when exposed to the high gas velocity and pressures of a combustion environment. Active oxidation causes recession of a component during operation, which can lead to eventual failure. Degradation of SiC/SiC by CMAS (calcia-magnesia-alumina-silicate) is another durability issue.

These concerns are reduced by the application of an environmental barrier coating (EBC) that consists of rare earth oxides. During operation, the EBC protects the underlying SiC/SiC substrate from the combustion. It has been assumed that EBC will remain adhered to the CMC substrate during the full life of the component. This full life, or prime reliant coating, may be difficult to validate for large civil turbine applications that have requirements that range from 5000 to 20,000 hours.

Methods disclosed herein provide a SiC based CMC with enhanced water vapor stability and CMAS resistance. Improved water vapor stability is achieved by incorporating rare earth elements, yttrium and ytterbium into a matrix, improved CMAS-resistance is achieved by incorporating aluminum oxide into a matrix. The rare earth elements can be introduced into the matrix by slurry or melt infiltration techniques. Y and Yb can be introduced into a matrix in the forms of oxides, silicates, silicides, or a Si—Y/Yb eutectic alloy. Aluminum can be introduced into a matrix in a form of oxide, silicate, silicide, or a Al—Si—Y/Yb eutectic alloy. A process can also include additional gadolinium oxide, Erbium oxide Lutetium oxide, silicate, silicide, or silicon eutectic alloy.

Materials produced by processes disclosed herein have advantages over current melt infiltrate SIC CMC protocols. Advantages include:
1. increased component life when compared to current SiC/SiC;
2. removal of the prime reliant status of EBCs;
3. reduced life cycle cost over current SiC/SiC due to increased component life;
4. reduction of manufacturing cost due to removal of EBC in certain areas of a component (potentially complete removal of BBC in some lower temperature (less than 2300° F. applications); and
5. improved adhesion of EBC due to increase material compatibility.

Figure 2:
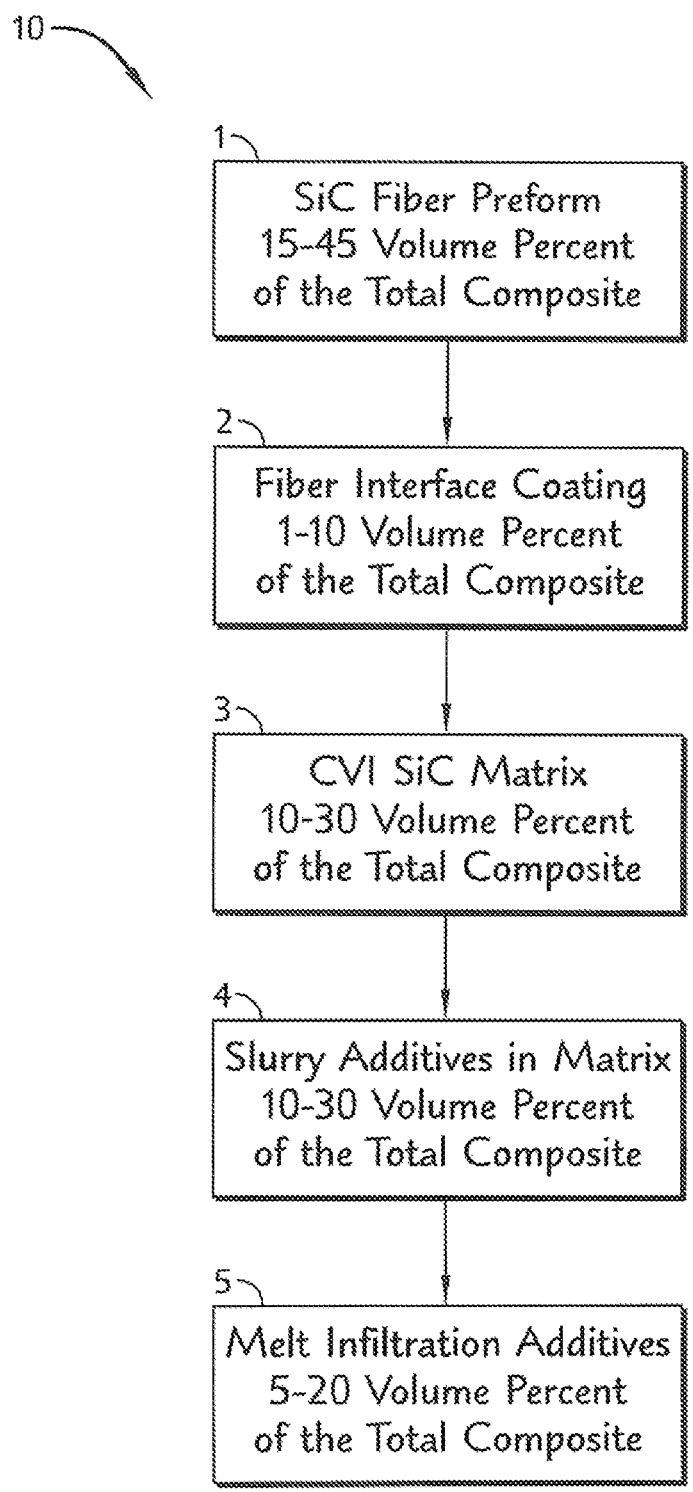
FIG. 2 is a flow diagram for a melt infiltrated SiC based ceramic matrix composite.

Embodiments of methods disclosed herein utilize a process 10 shown in FIG. 2 to infiltrate continuous or discontinuous fiber preforms. Processes disclosed herein produce a SiC based CMC that has improved water resistance over current materials. Improved water stability and CMAS stability aids insertion of SiC based CMCs into turbine applications.

As shown in FIG. 2, step (1) of the process 10 includes a SiC fiber preform, which is 15 to 45 vol % of the total composite. SiC fiber can be stoichiometric (e.g., Hi-Nicalon type S, Sylramic®, Tyranno® SA, etc.) or non-stoichiometric (e.g., Hi-Nicalon, CG Nicalon, Tyranno® ZMI, etc.). Fiber architecture selection is not limited by this process. The perform can be fabricated with a five-harness satin. eight-harness satin, plain weave, uni-weave, uni-tape, angle interlock, etc.

Step (2) of the process 10 includes fiber interface coating. The coating is 1 to 10 vol % of the total composite. Fiber coating includes, but is not limited to one or more layer of carbon, carbon nitride, boron nitride, silicon doped boron nitride, silicon nitride, or SINC. A fiber coating as described herein is about 0.1 µm to about 1.0 µm, about 0.1 to about 0.75 µm, about 0.1 µm to about 0.5 µm, wherein the coating can be about 1.0 µm, about 0.9 µm, about 0.8 µm, about 0.7 µm, about 0.6 µm, about 0.5 µm, about 0.4 µm, about 0.3 µm, about 0.2 µm, or about 0.1 µm.

Step (3) of the process 10 includes deposition of a SiC layer around individual layer/tows by chemical vapor infiltration (CVI). Coating of SiC by CVI is about 5 vol % to about 70 vol % of the total composite.

As shown in FIG. 2, step (4) of the process 10 includes incorporating additives to a composite via slurry infiltration (SI). Slurry additives comprise about 10 vol % to about 30 vol % of the total composite. A slurry may contain 3% to 100% yttrium oxide or ytterbium oxide. A slurry can contain SiC when the oxide content is less than 100%. A slurry can also contain yttrium silicate and/or ytterbium silicate. A slurry can contain yttrium silicate and ytterbium silicate in various ratios. A slurry can contain yttrium silicate and/or ytterbium silicate and 0 vol % to 97 vol % SiC. A slurry can also contain a mixture of SiC, alumina, yttrium oxide, and/or ytterbium oxide. A slurry can also contain metallic yttrium or metallic ytterbium.

Step (5) of the process 10 includes incorporating additives to a composite via melt infiltration (MI). MI additives comprise about 5 vol % to about 20 vol % or about 5 vol % to about 30 vol % of the total composite. MI can utilize a molten silicon, a Y—Al—Si eutectic alloy or Yb—Al—Si eutectic alloy. A molten silicon reacts with yttrium oxide and/or ytterbium oxide to form a Y/Yb—Si—O compound. Final composition of a composite depends on amounts of yttrium oxide and ytterbium oxide added to the slurry in step (4) of the process 10 shown in FIG. 2.

A molten silicon reacts with silicates to form a Si—Y/Yb—O alloy. Final composition of a composite depends on amounts of yttrium oxide and ytterbium oxide added to the slurry in step (4) of the process 10. A composite comprising a Si—Y/Yb—O alloy will form an oxide layer containing $SiO_2$ and yttrium/ytterbium silicate duringengine operation. As operations continue. such a composite forma yttrium or ytterbium monosilicate or disilicate layer.

When the slurry contains metallic yttrium or metallic ytterbium, the reaction during MI can produce yttrium and/or ytterbium silicides, which can include high temperature rare earth silicides (e.g., $YSi$, $Y_5Si_4$, $Y_5Si_3$, $Yb_3Si_5$, $YbSi$, etc).

EXAMPLES

Example 1

Addition of Ytterbium ($YB_2O_3$) or Yttrium Oxide ($Y_2O_3$) in the Slurry

In this example, steps (1) through (3) were performed. The slurry contained a mixture of SiC and yttrium oxide, ytterbium oxide, or a combination of the two oxides.

| Composite | |
|---|---|
| Composite constituent | Vol % |
| Fiber | 35 |
| Fiber interface coating (BN or C) | 3 |
| CVI SiC | 30 |
| Slurry SiC + oxide | 22 |
| MI silicon | 10 |

The slurry contained 3% to 100% by volume of yttrium or ytterbium oxide, with SiC being added to the slurry when oxide content is below 100%. SiC was added to obtain the desired volume percentage of matrix that is introduced during the slurry infiltration. After slurry infiltration, the part is infiltrated with molten silicon during step (5) of the process 10 shown in FIG. 2. During the melt infiltration process, molten silicon reacted with the $Yb_2O_3$ or $Y_2O_3$ to form a Y/Yb—Si—O compound. The composition of this compound depended on the amount of $Yb_2O_3$ or $Y_2O_3$ added to the slurry.

Example 2

Modification of the Slurry to Contain Yttrium/Ytterbium Monosilicate or Disilicate The slurry contains yttrium or ytterbium monosilicate or disilicate. The amount of yttrium silicate or ytterbium silicate in the slurry ranges from 3% to 100% by volume. The yttrium or ytterbium silicate added separately would be mixed in various ratios. In addition to these silicates, the slurry contained 0 to 97% silicon carbide by volume. SiC would be added to obtain the desired amount of matrix that is introduced during the slurry infiltration. During melt infiltration in step (5) of the process 10, molten silicon is introduced to the composite. During the infiltration, the molten silicon reacts with the silicate(s) to form a Si—Y/Yb—O alloy. Due to the higher stability of the silicate under vacuum, higher levels of oxygen will remain in the composite during melt infiltration. The increase oxygen will stabilize a higher melting temperature Si—Y/Yb—O alloy when compared to product formed in Example 1.

Example 3

Rare Earth Silicon Eutectic Infiltrations

Figure 3:
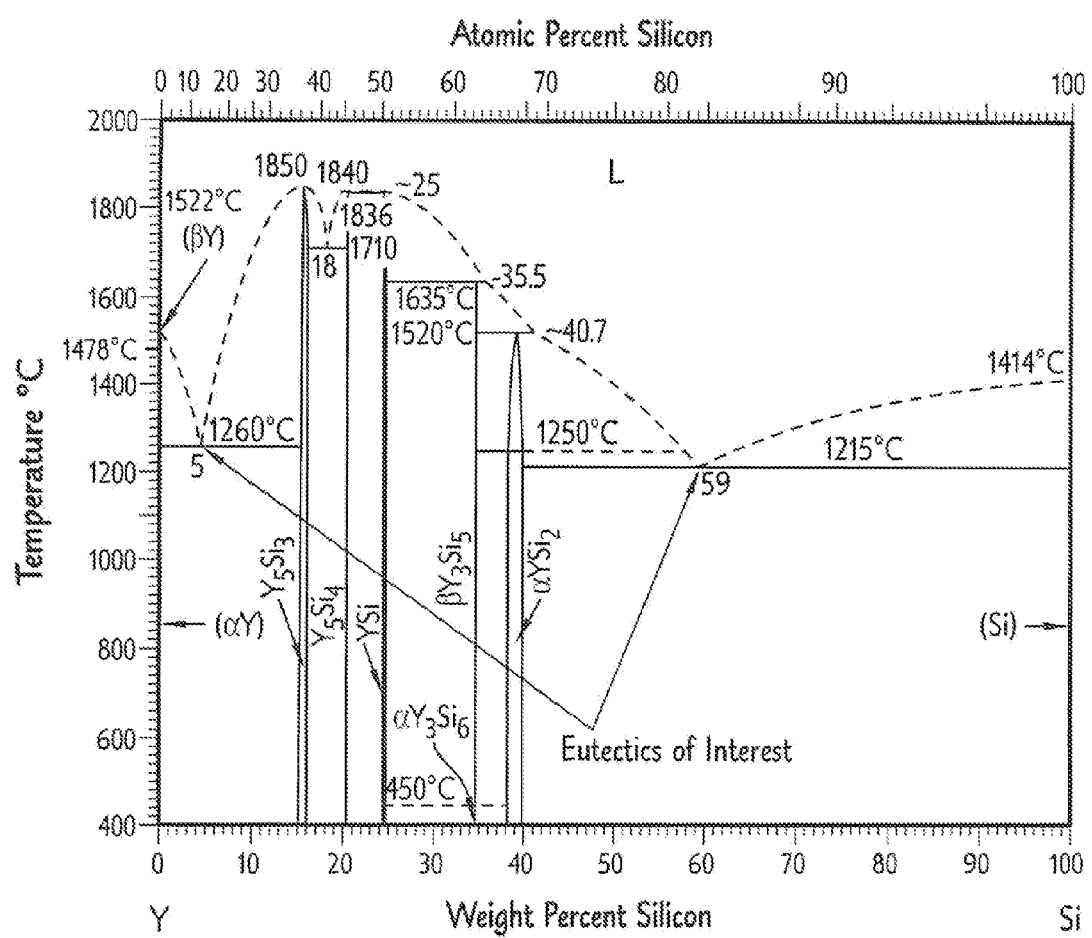
FIG. 3 is a phase diagram of Yttrium-silicon eutectics.
Figure 4:
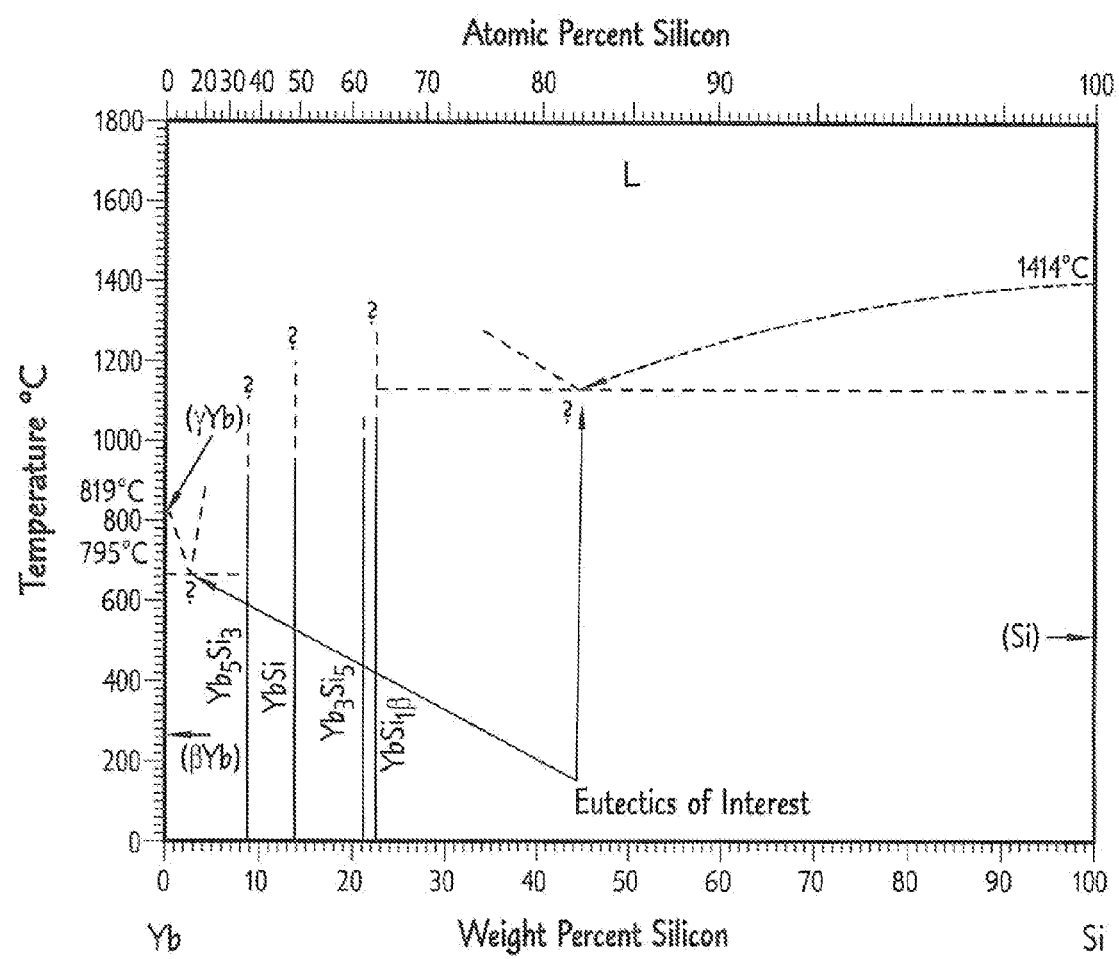
FIG. 4 is a phase diagram of Ytterbium-silicon eutectics.

In this example, the melt infiltration (MI) step of process 10 (i.e., step (5)) and the slurry (step (4)) are modified. In this example, the molten silicon in step (5) is replaced with either an yttrium-Si eutectic alloy (see FIG. 3) or ytterbium-Si eutectic alloy (see FIG. 4). A yttrium/ytterbium rich or silicon rich eutectic may be used. The matrix contains 5-30% melt product In addition to the Ml alloy modification. step (4) of the process 10 is modified to stabilize a higher melting temperature phase. This is achieved by introducing yttrium or ytterbium into the slurry used in step (4). The metallic element is added to provide a reaction during melt infiltration to form yttrium or ytterbium silicides. The amount of yttrium or ytterbium depends on the amount MI product introduced. The slurry contains sufficient material to form a high temperature rare earth silicide (YSi, $Y_5Si_4$, $Y_5Si3$, $Yb_3Si_5$, YbSi).

| Composite | |
|---|---|
| Composite constituent | Vol % |
| Fiber | 35 |
| Fiber interface coating (BN or C) | 3 |
| CVI SiC | 30 |
| Slurry SiC + oxide | 22 |
| MI silicon | 10 |

In the example, formation of $Y_5Si_4$ is desired, and the eutectic alloy contained 59% silicon by weight. The assumed density for the Y—Si eutectic is 2.90 g/cm³. The reaction to form the final product of $Y_5Si_4$ is the following:

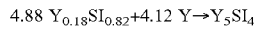

4.88 $Y_{0.18}SI_{0.82}$+4.12 Y→$Y_5SI_4$

The slurry contained 57 vol % yttrium and 43 vol % SiC.

The constituents used in process step (4) depend on the desired final product and the amount and type of alloy introduced during process step (5). During engine operations, the composite of Example 3 form a rare earth monosilicate or disilicate. The oxidation product depended on the rare earth suicide and content within the composite.

Example 4

Modified Slurry

In this example, the same process as Example 1 is used except for the following modification. The slurry contains a mixture of a) SiC, b) alumina and yttrium oxide, c) ytterbium oxide, d) aluminum oxide, or e) a combination of yttrium oxide and ytterbium oxide.

Example 5

Rare Earth Aluminum Silicon Eutectic Infiltrations

In this example, the same process of Example 3 is used except for the following modification. The molten silicon of process step (5) is replaced with either an yttrium- or ytterbium-Al—Si eutectic alloy.

While the disclosure has been illustrated and described in detail in the foregoing drawings and description, the same is to be considered as exemplary and not restrictive in character, it being understood that only illustrative, embodiments thereof have been shown and described and that all changes and modifications that come within the spirit of the disclosure are desired to be protected.

What is claimed is:

1. A method of producing a silicon carbide (SiC) ceramic matrix composite (CMC), the method comprising:
    forming a SiC fiber preform;
    incorporating a slurry comprising yttrium or ytterbium into the SiC fiber perform via slurry infiltration; and
    infiltrating the SiC fiber perform with a melt comprising silicon, therby forming the SiC ceramic matrix composite.

2. The method of claim 1, wherein the slurry further comprises SiC.

3. The method of claim 1, wherein the slurry comprises metallic yttrium, metallic ytterbium, yttrium oxide, ytterbium oxide, yttrium silicate and/or ytterbium silicate.

4. The method of claim 1, wherein the slurry further comprises aluminum oxide.

5. The method of claim 1, wherein the melt comprises a eutectic ally selected from a Y—Al—Si eutectic alloy and a Yb—Al—Si eutectic alloy.

6. The method of claim 1, wherein the composite comprises a Y—Si—O compound and/or a Yb—Si—O compound.

7. The method of claim 6, wherein the composite comprises yttrium silicide and/or ytterbium silicide selected from the group consisting of YSi, $Y_5Si_4$, $Y_5Si_5$, and YbSi.

8. The method of claim 1, further comprising before the slurry infiltration, applying a fiber interface coating to the SiC fiber preform, the fiber interface coating comprising carbon, carbon nitride, boron nitride, silicon-doped boron nitride, silicon notride, or SiNC.

9. The method of claim 8, further comprising, after applying the fiber interface coating, depositing a SiC matrix layer by chemical vapor infiltration.

10. The method of claim 9, wherein the composite comprises:
    the SiC fiber preform at 15-45 vol. % ;
    the fiber interface coating at 1-10 vol. % ;
    the SiC matrix layer at 10-30 vol. % ;
    slurry additives at 10-30 and
    melt infiltration additives at 5-20 vol. % .

11. The method of claim 1, wherein the slurry includes from 3% to 100% by volume of yttrium silicate and/or ytterbium silicate and from 0 vol. % to 97 vol. % SiC.

12. The method of claim 1, wherein the slurry comprises SiC, alumina, yttrium oxide and/or ytterbium oxide.

13. The method of claim 1, wherein the slurry further comprises gadolinium oxide, erbium oxide, or lutetium oxide.

* * * * *